(12) United States Patent
Lurey et al.

(10) Patent No.: US 10,356,079 B2
(45) Date of Patent: Jul. 16, 2019

(54) SYSTEM AND METHOD FOR A SINGLE SIGN ON CONNECTION IN A ZERO-KNOWLEDGE VAULT ARCHITECTURE

(71) Applicant: Keeper Security, Inc., Chicago, IL (US)

(72) Inventors: Craig B. Lurey, El Dorado Hills, CA (US); Darren S. Guccione, Chicago, IL (US)

(73) Assignee: KEEPER SECURITY, INC., Chicago, IL (US)

( * ) Notice: Subject to any disclaimer, the term of this patent is extended or adjusted under 35 U.S.C. 154(b) by 259 days.

(21) Appl. No.: 15/368,943

(22) Filed: Dec. 5, 2016

(65) Prior Publication Data

US 2018/0159842 A1 Jun. 7, 2018

(51) Int. Cl.
| | | |
|---|---|---|
| G06F 21/41 | (2013.01) | |
| G06F 21/60 | (2013.01) | |
| H04L 29/06 | (2006.01) | |
| H04L 29/08 | (2006.01) | |
| H04W 12/06 | (2009.01) | |

(52) U.S. Cl.
CPC .......... *H04L 63/0815* (2013.01); *G06F 21/41* (2013.01); *G06F 21/602* (2013.01); *H04L 63/083* (2013.01); *H04L 67/02* (2013.01); *H04W 12/06* (2013.01); *H04L 63/0823* (2013.01); *H04L 63/168* (2013.01); *H04L 67/26* (2013.01)

(58) Field of Classification Search
CPC ... H04L 63/0815; H04L 63/06; H04L 63/083; H04L 67/02; H04L 67/26; G06F 21/41; G06F 21/602
See application file for complete search history.

(56) References Cited

U.S. PATENT DOCUMENTS

| | | | | |
|---|---|---|---|---|
| 8,706,800 | B1 * | 4/2014 | Ahmed | G06F 9/468 709/201 |
| 9,191,381 | B1 * | 11/2015 | Popp | G06F 21/34 |
| 9,461,820 | B1 * | 10/2016 | Dall | H04L 63/0838 |
| 2003/0105807 | A1 * | 6/2003 | Thompson | H04L 29/06 709/203 |
| 2006/0129817 | A1 * | 6/2006 | Borneman | G06F 21/41 713/170 |
| 2006/0206932 | A1 * | 9/2006 | Chong | H04L 63/0807 726/10 |
| 2007/0101418 | A1 * | 5/2007 | Wood | G06F 21/31 726/8 |
| 2010/0017616 | A1 * | 1/2010 | Nichols | G06F 21/41 713/183 |
| 2010/0100924 | A1 * | 4/2010 | Hinton | G06F 21/10 726/1 |

(Continued)

OTHER PUBLICATIONS

Berners-Lee et al., "Unifomr Resource Identifer (URI): Generic Syntax", Jan. 2005, Network Working Group: RFC 3986, pp. 1-61. (Year: 2005).*

*Primary Examiner* — Nelson Giddins
(74) *Attorney, Agent, or Firm* — Klintworth & Rozenblat IP LLP

(57) ABSTRACT

A system and/or method include a connect module for facilitating a single sign-on to a digital vault provided by a service provider in a zero-knowledge architecture.

19 Claims, 23 Drawing Sheets

(56) References Cited

U.S. PATENT DOCUMENTS

| | | | |
|---|---|---|---|
| 2010/0154041 A1* | 6/2010 | Dalzell | G06F 21/41 726/6 |
| 2011/0078437 A1* | 3/2011 | Reddy | H04L 63/0815 713/155 |
| 2012/0023568 A1* | 1/2012 | Cha | G06F 21/335 726/10 |
| 2012/0254957 A1* | 10/2012 | Fork | G06F 21/33 726/6 |
| 2013/0205360 A1* | 8/2013 | Novak | H04L 63/102 726/1 |
| 2013/0219176 A1* | 8/2013 | Akella | H04L 63/0815 713/165 |
| 2014/0189808 A1* | 7/2014 | Mahaffey | H04L 63/083 726/4 |
| 2014/0298419 A1* | 10/2014 | Boubez | H04L 63/08 726/4 |
| 2015/0012751 A1* | 1/2015 | Forster | H04L 9/30 713/171 |
| 2015/0256530 A1* | 9/2015 | Semba | H04L 63/083 726/5 |
| 2015/0288679 A1* | 10/2015 | Ben-Nun | H04L 67/141 726/10 |
| 2016/0065579 A1* | 3/2016 | Chen | G06F 21/45 726/4 |
| 2016/0134599 A1* | 5/2016 | Ross | H04L 63/08 713/168 |
| 2016/0140335 A1* | 5/2016 | Proulx | G06F 21/45 726/6 |
| 2016/0191499 A1* | 6/2016 | Momchilov | H04L 63/0815 713/171 |
| 2016/0205108 A1* | 7/2016 | Si | H04L 63/102 726/4 |
| 2016/0294548 A1* | 10/2016 | Qian | H04L 63/062 |
| 2016/0308858 A1* | 10/2016 | Nordstrom | H04L 63/068 |
| 2017/0048215 A1* | 2/2017 | Straub | G06Q 30/0603 |
| 2017/0094509 A1* | 3/2017 | Mistry | H04L 63/083 |
| 2017/0118190 A1* | 4/2017 | Livesay | G06K 9/00288 |
| 2017/0155634 A1* | 6/2017 | Camenisch | H04L 63/083 |
| 2017/0212701 A1* | 7/2017 | Shifman | G06F 11/1448 |
| 2017/0228559 A1* | 8/2017 | Jackson | G06F 21/6245 |
| 2017/0279613 A1* | 9/2017 | Sokolov | H04L 9/3228 |
| 2018/0007059 A1* | 1/2018 | Innes | G06F 21/33 |
| 2018/0041336 A1* | 2/2018 | Keshava | H04L 9/0894 |
| 2018/0137291 A1* | 5/2018 | Ho | G06F 21/602 |
| 2018/0152440 A1* | 5/2018 | Hande | H04L 63/0815 |
| 2018/0270201 A1* | 9/2018 | Chanak | H04L 63/0272 |

* cited by examiner

SYSTEM AND METHOD FOR A SINGLE SIGN ON CONNECTION IN A ZERO-KNOWLEDGE VAULT ARCHITECTURE

BACKGROUND

The computing industry continues to produce a multitude of computing devices programmed with network capabilities and access. As more services are made available to computing devices, the need for more comprehensive access security for given services and data can increase. Service providers have therefore established more rigorous password and authentication processes, which are designed to provide authorized use or access to sensitive data. These improved processes, however, also increase the complexity for entering the data. As a result of having more rigorous passwords and authentication processes, users can become frustrated when attempting to access services for which they pay, and in some cases, users cancel services simply because access of the services is too cumbersome, time consuming or complex.

SUMMARY

In one aspect, a system and/or method includes a connect module for facilitating a single sign-on to a digital vault provided by a service provider. The connect module detects a login attempt, where the login attempt is from an application provided by the service provider and is stored locally on a client device. The connect module performs a redirect and sends the client device to authenticate on an identity provider with one or more login credentials. The connect module receives, via a security protocol, an authentication of the client device from the identity provider, without receiving an encryption key. The connect module provides a master password to the application local to the client device in response to the authentication, where the master password decrypts the digital vault without the service provider knowing the master password.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

DESCRIPTION

A system and method can facilitate a single sign-on in a zero-knowledge vault architecture of a service provider. In one aspect, the zero-knowledge architecture provides a system of client-side encryption where the service provider has no ability to access or decrypt a customer's stored information. A connect module provided by the service provider can offer client-side device decryption of private data stored in the service provider's digital vault, without disclosing any information to the service provider. In one aspect, an application is hosted on-premise with the client-side device or within a client-side device's control. In another aspect, the service provider's connect module can authenticate and generate master passwords, and securely hand-off the master passwords to the client device without leakage/exposure to the service provider or an identity provider. In another aspect, the service provider's connect module can provide authentication and subsequent local client-side decryption of the data stored inside the vault provided by the service provider. By providing client devices with single sign-on functionality to the zero-knowledge architecture, the client devices can benefit from a convenience of single sign-on and the security of client-side decryption.

Figure 1:
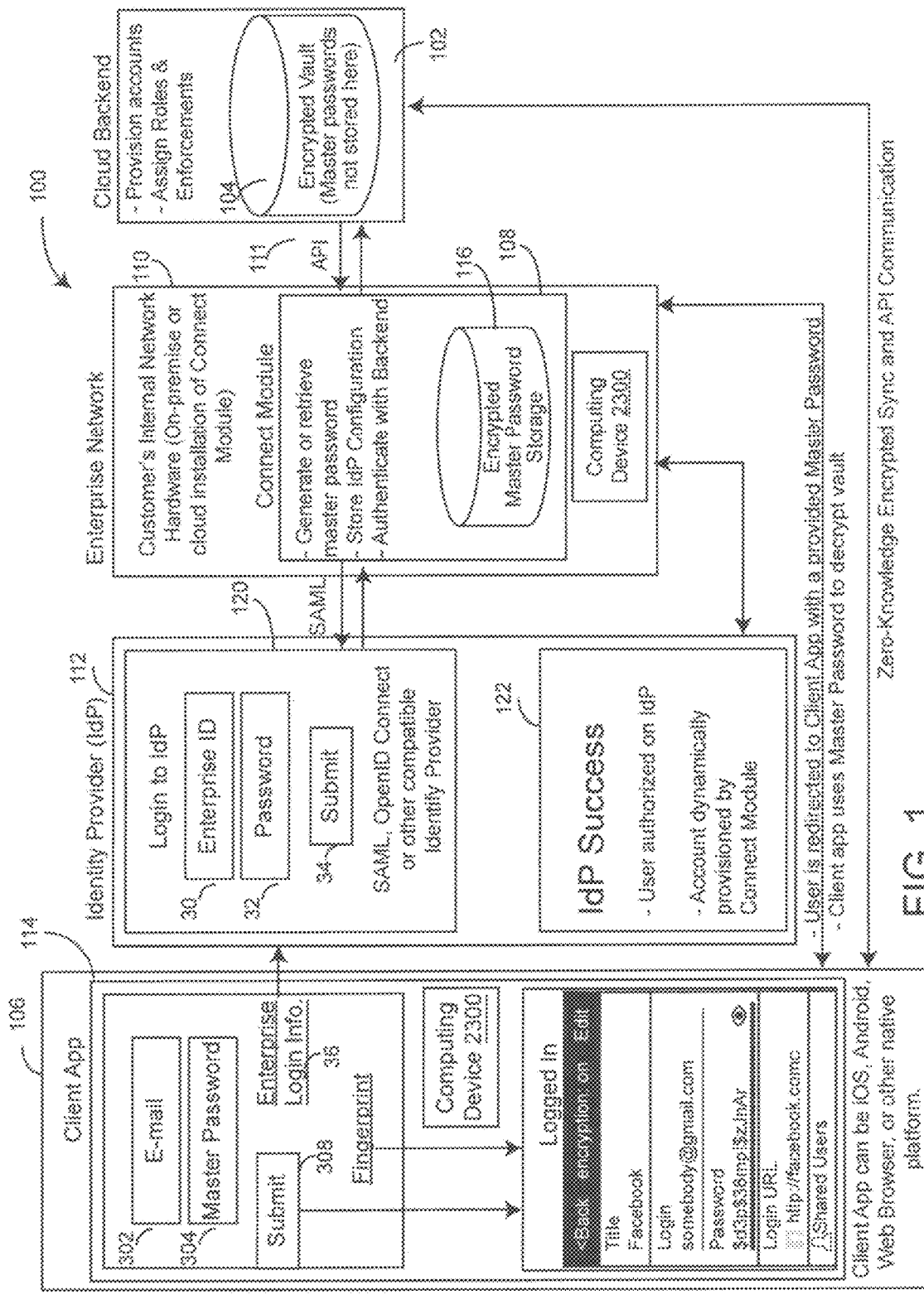
FIG. 1 is a block diagram of an example environment providing single sign-on in a zero-knowledge vault architecture.

FIG. 1 is a block diagram of an example environment 100 to provide single sign-on functionality in a zero-knowledge vault architecture. The environment 100 can include a backend 102 of the service provider which provides a digital vault 104 accessible by a customer's client device 106. In some aspects, the backend 102 can be implemented as a digital vault software application hosted by the service provider's infrastructure, e.g. using a cloud or on-premise hosting provider. In one example, the digital vault 104 is hosted by an AMAZON Web Service (AWS), or other secure cloud services platform, which can provide compute power, database storage, content delivery and/or other functionality of the backend 102. The customer can use the digital vault 104 to securely store, protect, manage and/or share passwords, documents, digital assets, photos and other information, etc. via the client device 106. The client device 106 can include one or more of a personal computer (PC), a desktop, a laptop, a tablet, a smartphone, a personal digital assistant (PDA), etc.

To help provide the client device 106 with access the digital vault 104 a connect module 108 is included in the customer's enterprise network 110. As described in more detail below, the connect module 108 establishes single sign-on by the client device 106 to the vault 104 in the zero-knowledge architecture of the service provider. The client-side enterprise network 110 includes internal network hardware for accommodating the on-premises or cloud installation of the connect module 108 to the enterprise network 110. Client-side networks other than an enterprise networks can be used, e.g., local area networks (LAN), wide area networks (WAN), wireless local area networks (WLAN), metropolitan area networks (MAN), etc.

The connect module 108 includes a Security Assertion Markup Language (SAML)/OpenID Connect-compatible application that allows the connect module 108 to communicate with the client device 106 and an identity provider (IdP) 112 so that the client device 106 can seamlessly login to the digital vault 104 using the authorization of the identity provider 112. The identity provider 112 includes an enterprise identification (ID) field 30, password field 32 and submit button 34 for processing enterprise login information 36 from the client application 114. The connect module 108 can also interface with the backend 102 via an application programming interface (API) 111, e.g., to dynamically provision the client device 106 and authenticate existing client devices 106 with the backend 102. As used herein, apps, applications, APIs, etc. can be implemented as code stored in memory 2314 and executed by the processor 2312 (see, e.g., FIGS. 2 and 23) (113).

The client device 106 includes a client application 114 to provide a user interface for the client device 106 to log into the vault 104. The client application 114, which can be provided by the service provider for use by the client device 106, can be executed on various platforms including but not limited to iOS, ANDROID, a web browser or other native platform. In the zero-knowledge architecture, the client device 106 has full control over the encryption and decryption of its data. For example, encryption occurs at the client device 106 level throughout the entire transport process of the connection between the client application 114 and the vault 104. The encryption key that decrypts the data from the vault 104 resides with the client device 106. The service provider cannot access or decrypt the customer's information stored in the vault 104. Additionally or alternatively, the service provider does not have access to the master password provided to the client device 106. The connect module 108 residing on the enterprise network 110 generates and retrieves the master password, and stores the master password in an encrypted storage 116 of the connect module 108 on the enterprise network 110. The connect module 108 can also store a configuration of the identity provider 112 on the enterprise network 110 and authenticate with the backend 102.

Figure 2:
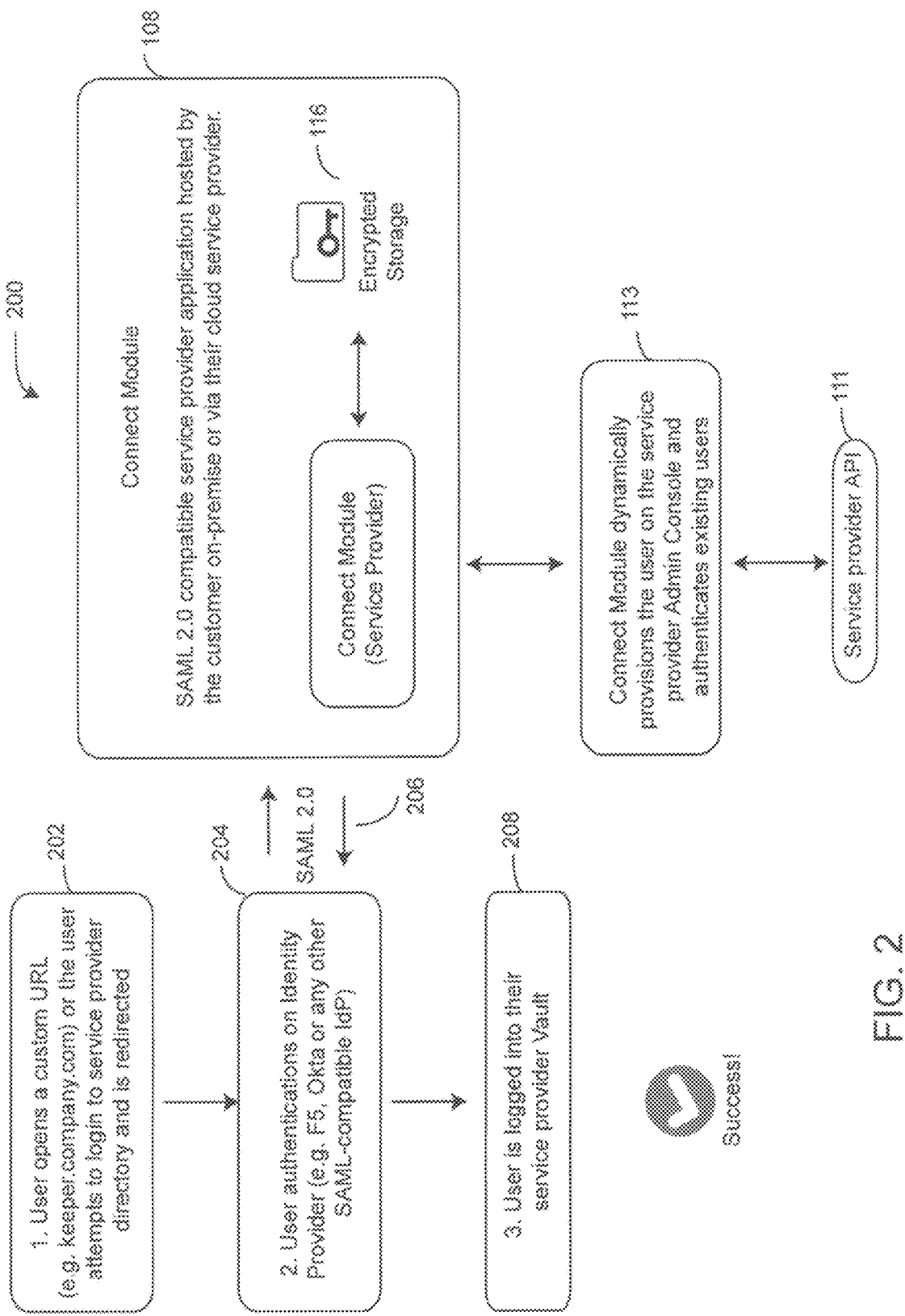
FIG. 2 is a block diagram of an example message flow diagram of the connect module as provided by the service provider and stored with the client's enterprise network.

FIG. 2 is a block diagram of an example message flow diagram 200 of the connect module 108 as provided by the service provider and stored with the client's enterprise network 110. A customer can install and configure the connect module 108, which is provided by the service provider, on one or more of the customer's enterprise network 110, other client-side on-premise server, and/or with a cloud hosting provider that is not operated by the service provider. The identity provider 112 is configured within the connect module 108. Access to the connect module 108 can be opened with a determined Internet protocol (IP) address or hostname (e.g., keeper.mycompany.com).

The client device 106 launches the login URL (e.g., keeper.mycompany.com), or attempts to sign into the vault 104 directly and is redirected to the connect module's 108 login uniform resource locator (URL) (e.g. keeper.mycompany.com) (202). The connect module 108 performs a redirect and sends the client device 106 to authenticate on the configured identity provider (IdP) 112, e.g., OKTA, F5, OneLogin, etc. (204). The redirect can be performed using a secure communication redirect, e.g., over a transport layer security (TLS) or secure socket layer (SSL), etc., or other way that is hidden to the identity provider 112 and service provider. In one aspect, the secure communication redirect can be performed using a protocol including but not limited to Hypertext Transfer Protocol Secure (HTTPS), a push notification, etc. The client device 106 authenticates on an identification page 120 of the identity provider 112 with one or more determined login credentials (e.g., passwords or biometrics). By way of security protocols (SAML, OpenID Connect, etc.), the identity provider 112 only performs authentication, not distribution of an encryption key that can decrypt data. The identity provider 112 redirects the client device 106 back to the connect module 108 with a SAML, OpenID Connect, etc. assertion 122 to validate the transaction (206). The connect module 108 can create a strong, randomly generated master password on behalf of the client device 106, and store the master password in an encrypted format, e.g., in the encrypted storage 116 on the client-side, e.g., in the enterprise network 110. If a master password has already been generated in a previous session for the client device 106, no new master password need be generated and the previously generated master password is retrieved from the encrypted storage 116.

The connect module 108 sends the redirect directly to the client application 114 (e.g. KEEPER Web Vault, IPHONE App, ANDROID App, Desktop App, etc.) that includes the master password. The master password can be encoded in the redirect within the fragment identifier of the URL. The fragment identifier is not transmitted beyond the scope of the redirect, and remains stored within the memory of the client device 106 so as not to be accessible by the service provider. The client application 114 reads the master password from the fragment identifier sent by the connect module 108, and derives an encryption key using a password derivation function, e.g., Password-Based Key Derivation Function 2 (PBKDF2) or other security key algorithm.

Using the key, the client application 114 decrypts the digital vault 104, and the client device 106 is logged into the vault 104 and able to decrypt and access the data from the vault 104 (208). The cipher keys used to encrypt and decrypt client device related records are not stored or transmitted to the vault 104. Information that is stored and accessed at the vault 104 is accessible only by the client device 106, not the service provider, because it is instantly encrypted and decrypted on-the-fly on the client device 106 that is being used, e.g., even when using the client application 114 provided by the service provider. The vault 104 is able to authenticate the client device 106 and decrypt the data for the client device 106 without the identity provider 112 or service provider's servers having access to the encryption key. Therefore, the connect module 108 complies to the zero-knowledge security architecture while giving the client device 106 the flexibility of providing seamless single-sign-on logins to the vault 104.

Figure 3:
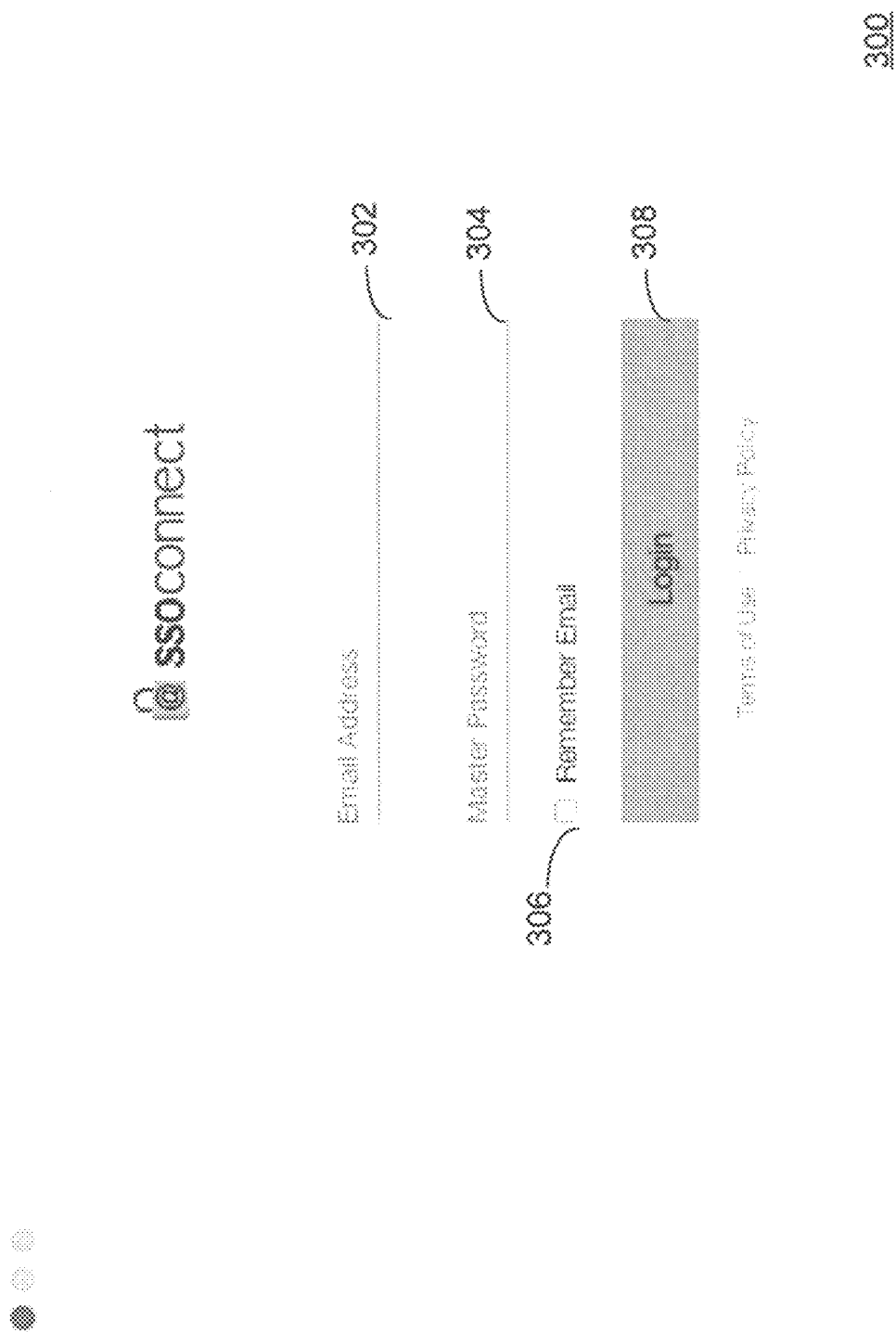
FIGS. 3-11 are screenshots of example login screens of the client application provided by the service provider for the client device.
Figure 4:
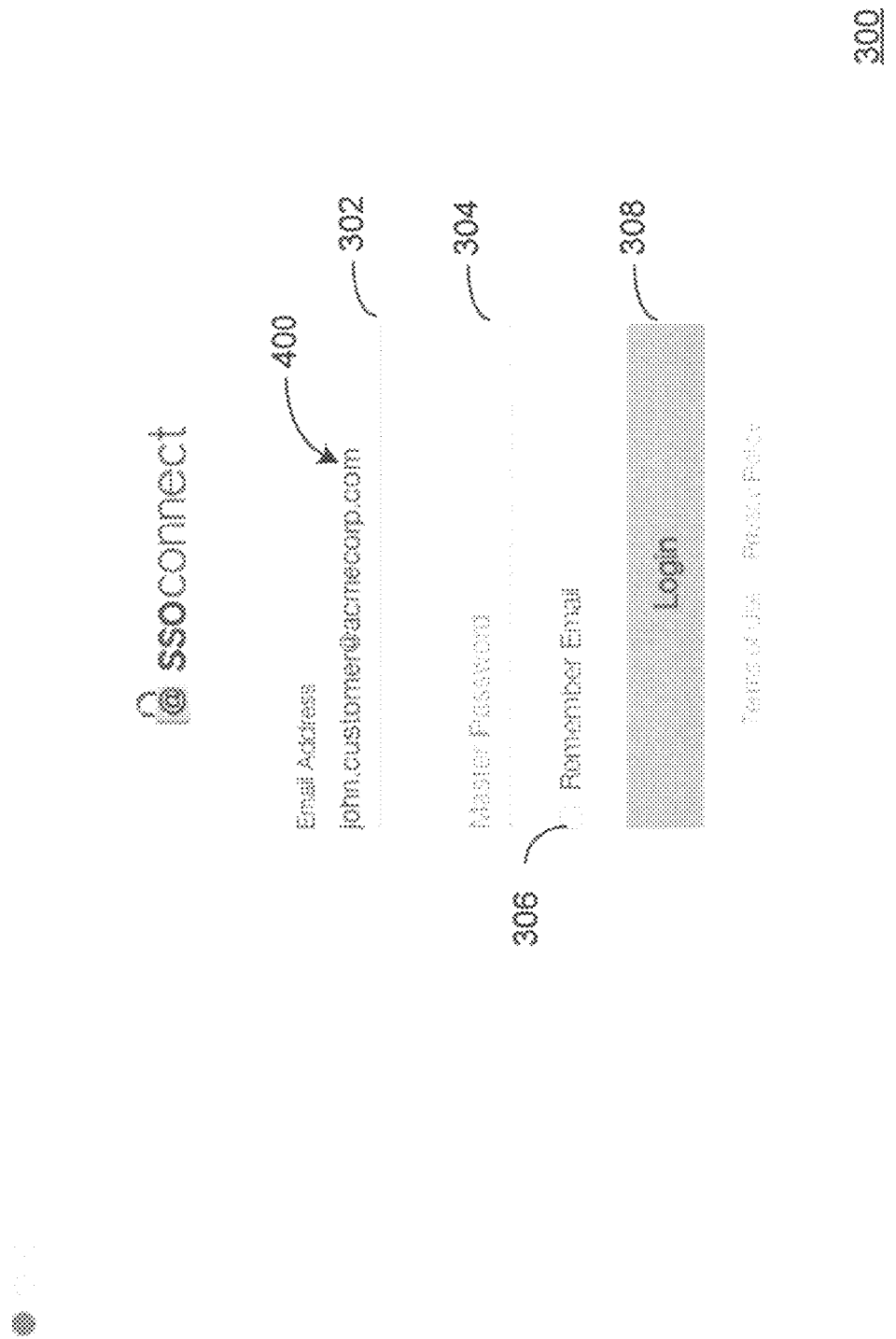
Figure 5:
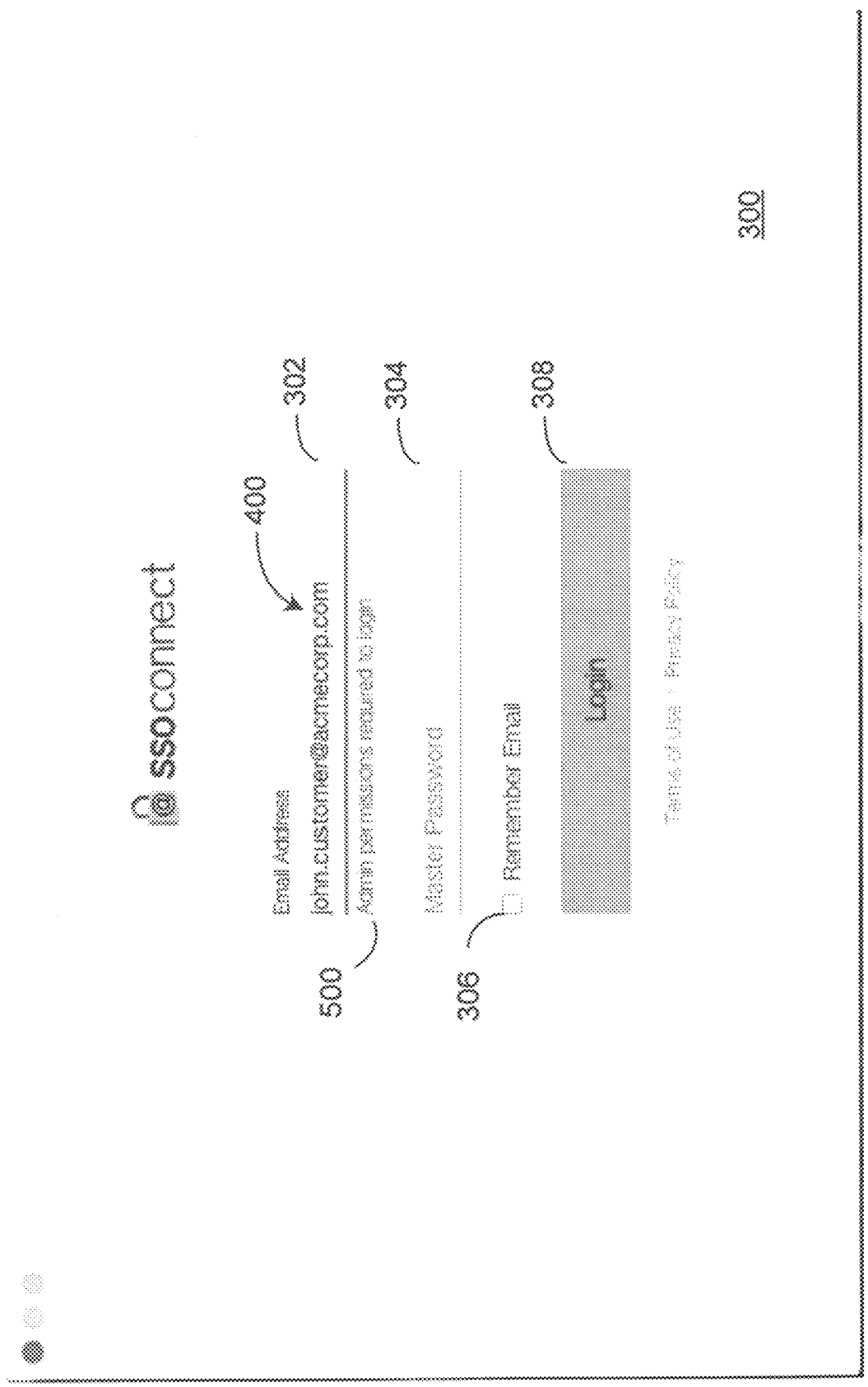
Figure 6:
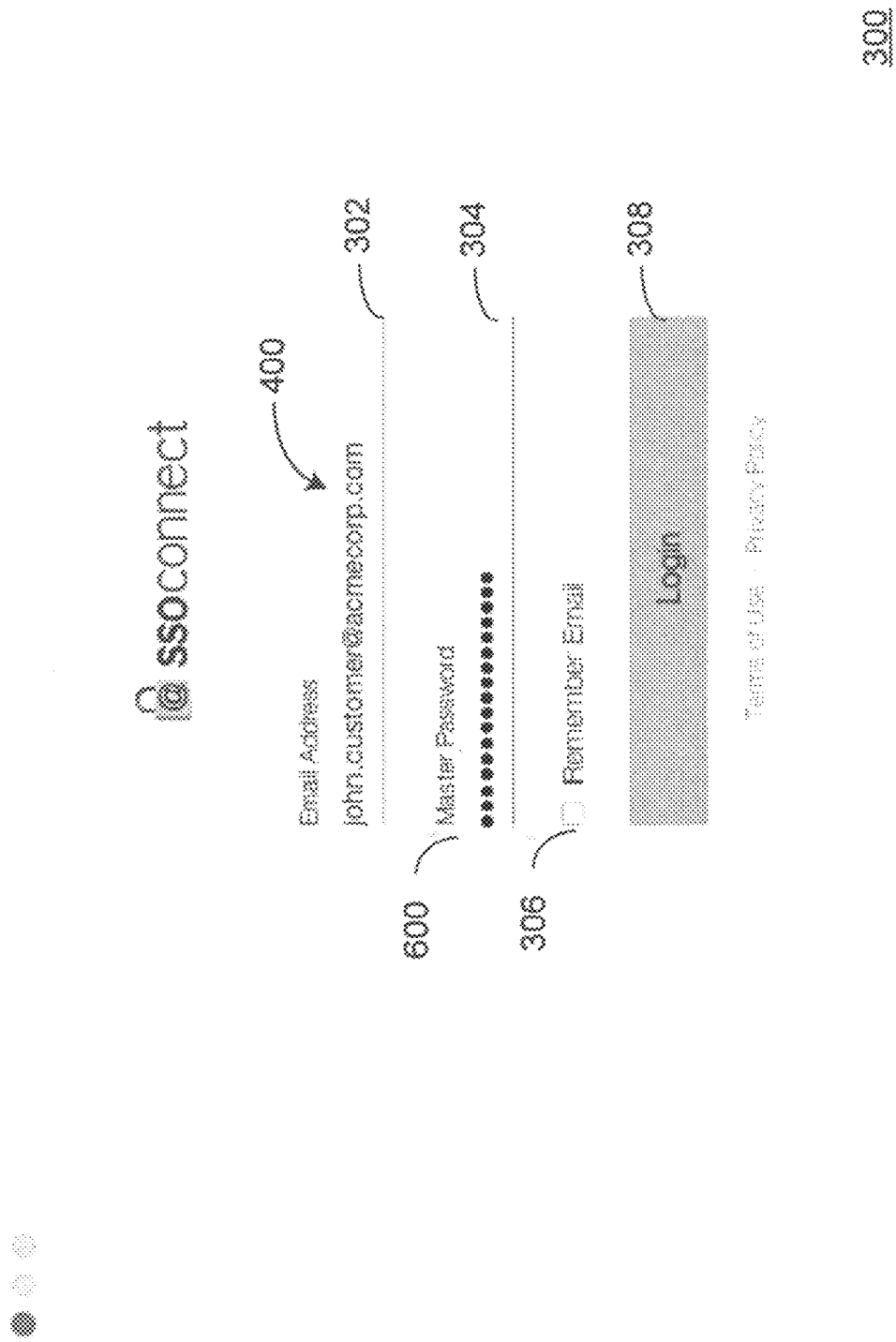
Figure 7:
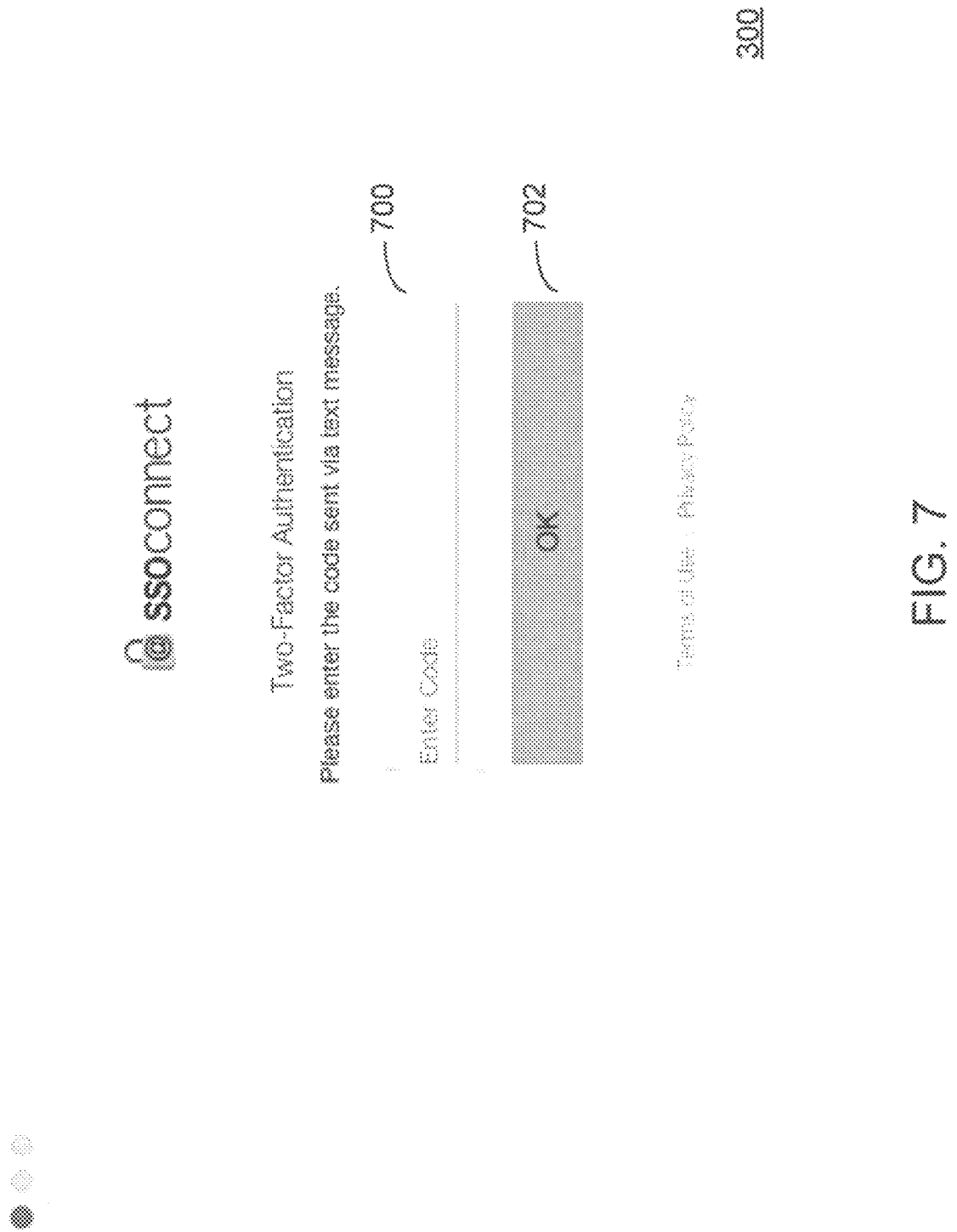
Figure 8:
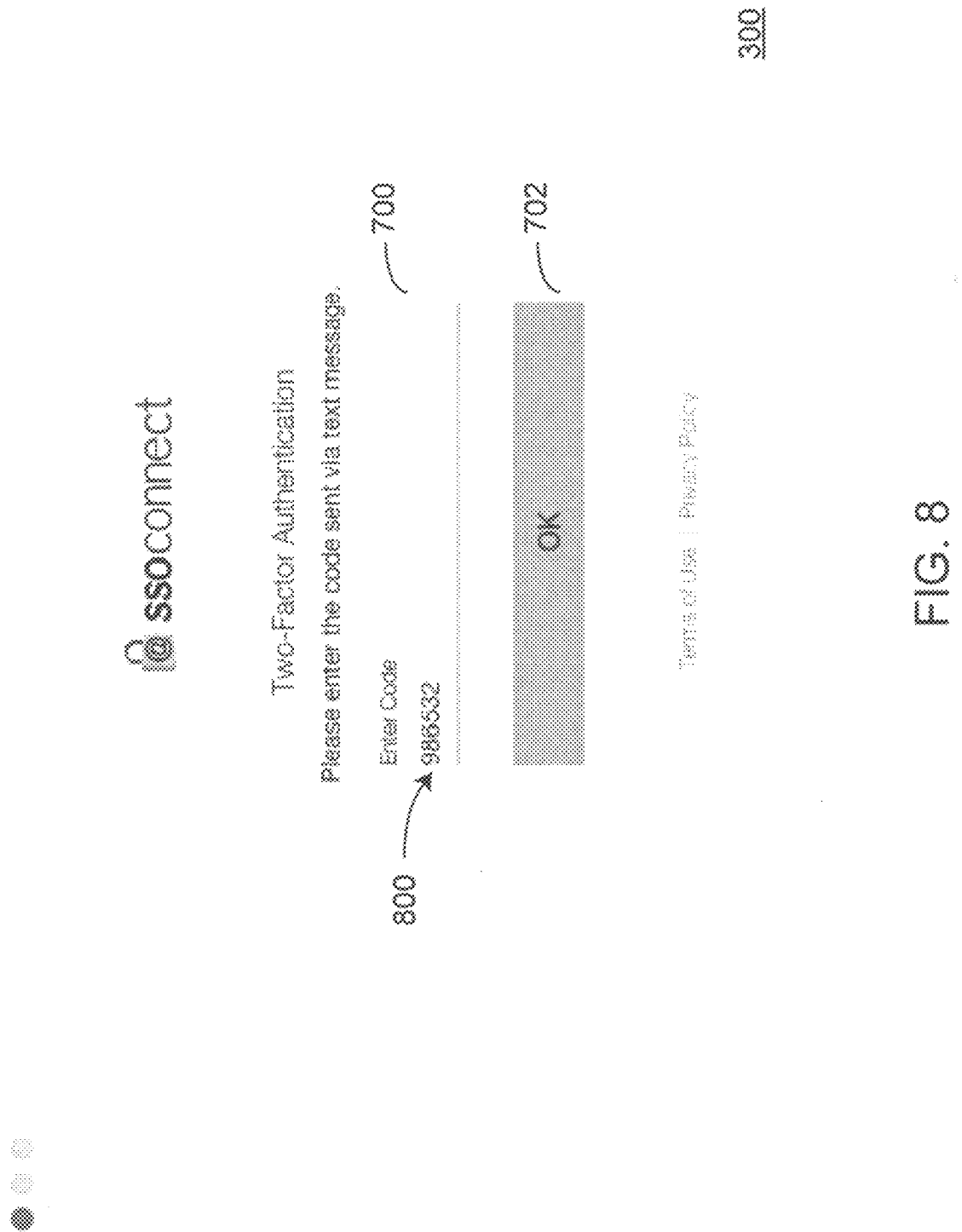
Figure 9:
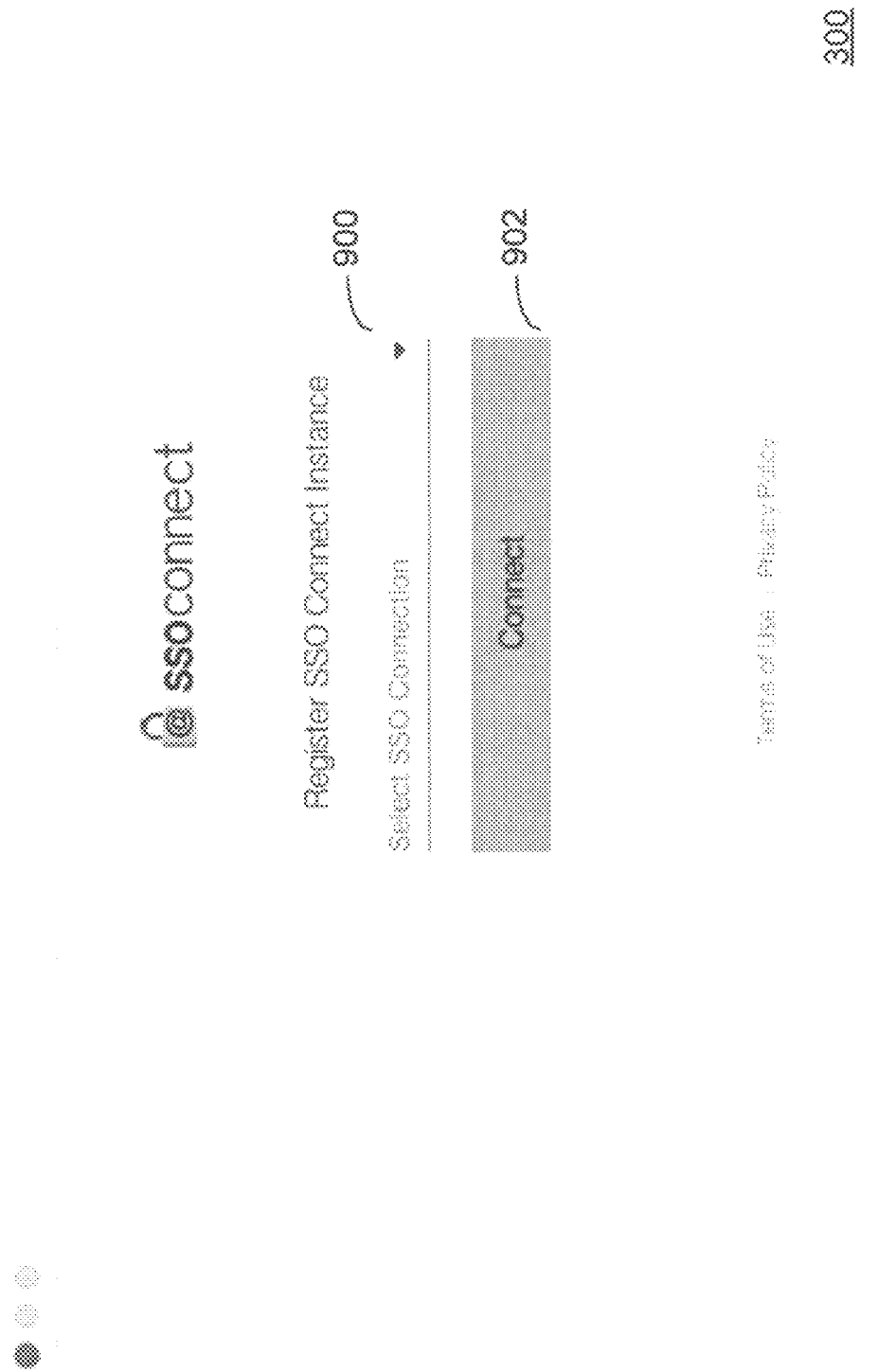
Figure 10:
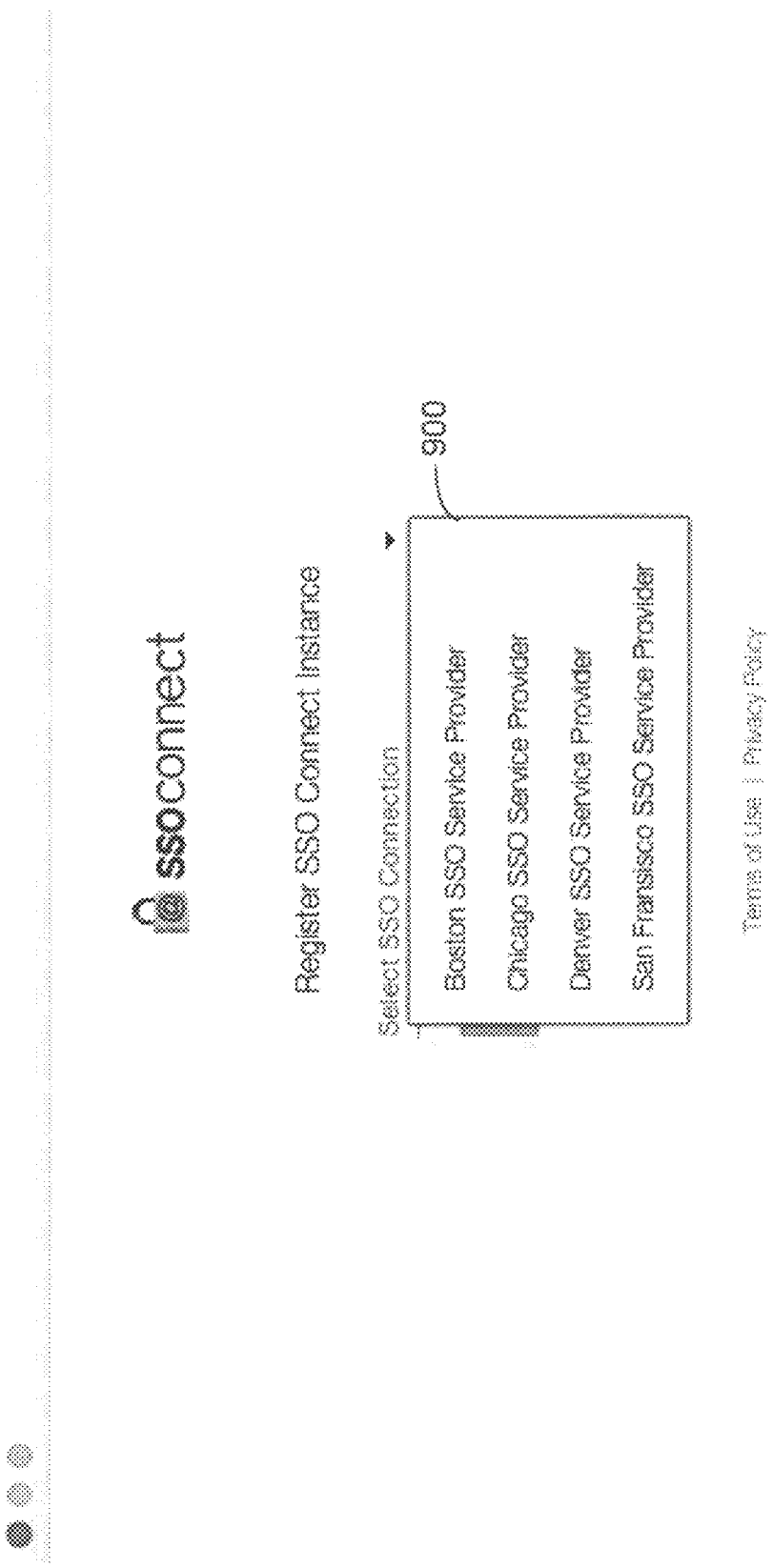
Figure 11:
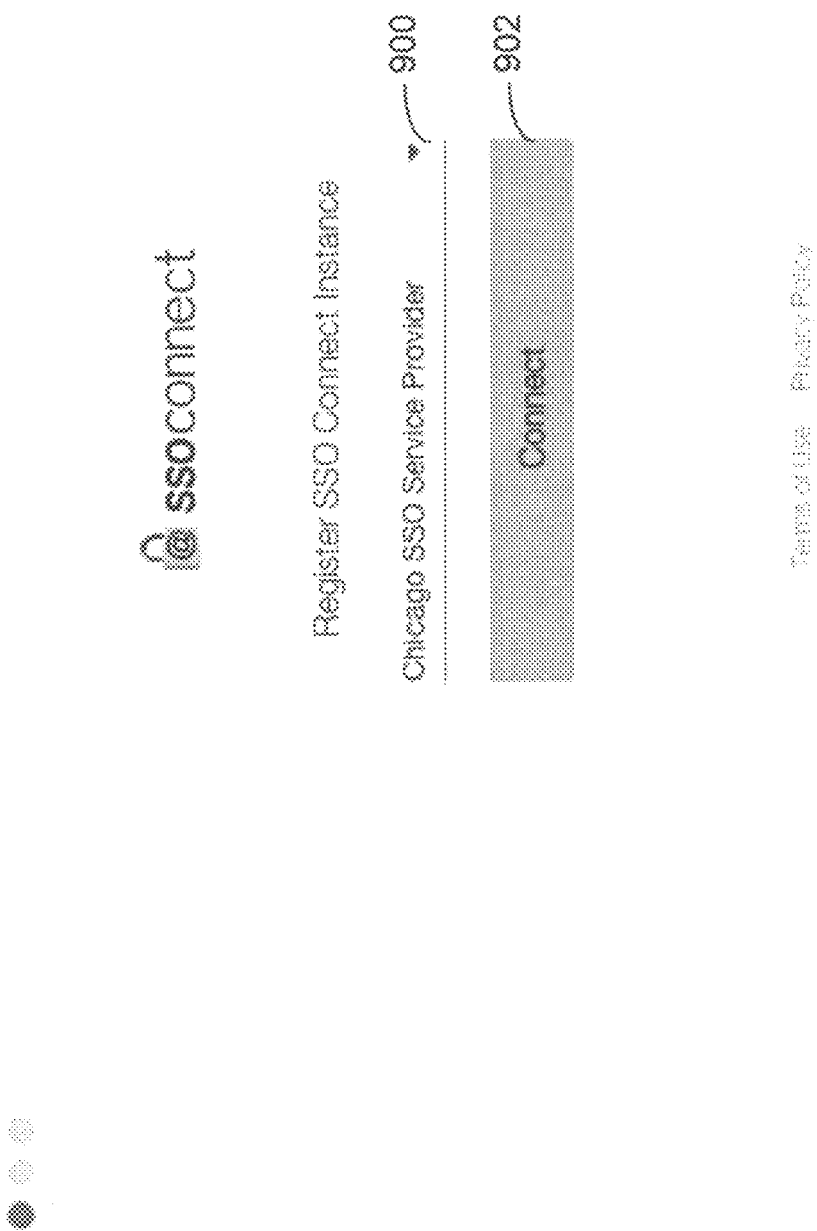

FIGS. 3-11 are screenshots of example login screens 300 of the client application 114 provided by the service provider for the client device 106. In FIG. 3, the login screen 300 can supply an email address field 302, a master password field 304, a 'remember me' checkbox 306 and a login/submit button 308. In FIG. 4, the client device 106 enters an email address 400 of the customer. In FIG. 5, in response to the entered email address 400, the client application 114 can display a warning message 500, e.g., 'administrator permissions required to login.' In FIG. 6, the client device 106 enters the master password 600 and the login button 308 is engaged. In implementations with two-factor authentication, the client device 106 displays an 'enter code' field. In FIG. 8, the client device enters the code 800 into the field and engages the 'OK' button 702. The code 800 can be sent to the client device 106 as a text message, an email, an image, etc. In FIG. 9, once the administrator is signed in the client application 114 can display a registration field 900 with a pull-down menu for registering the connect module 108 to the client device 106. In FIG. 10, the registration field 900 display service providers to choose from. In one implementation, the service providers can be selected by region, e.g., Boston, Chicago, Denver, San Francisco, etc. In FIG. 11, a service provider is selected and the connect button 902 is engaged.

Figure 12:
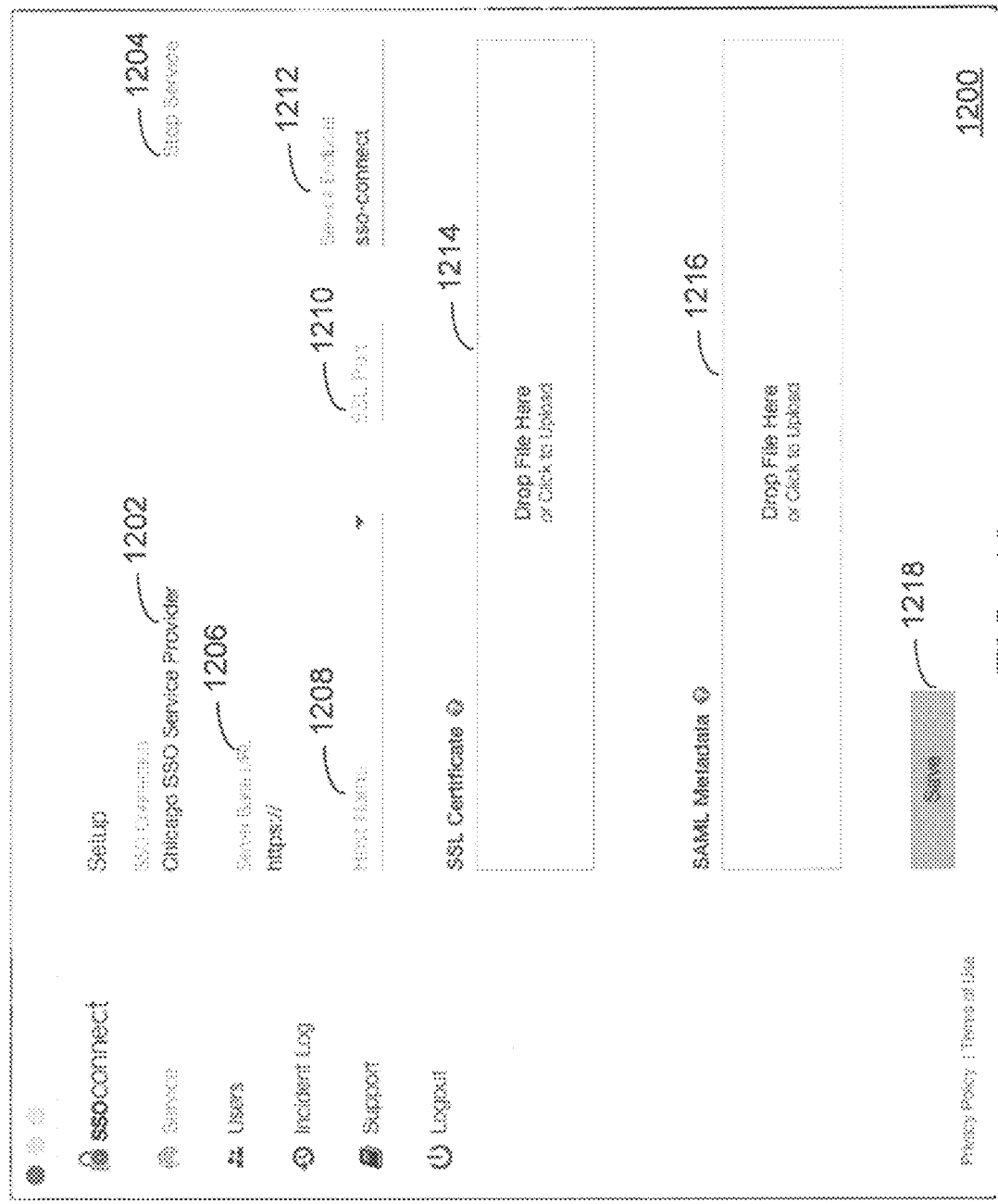
FIGS. 12-17 are screenshots of example setup screen of the client application provided by the service provider for the client device.
Figure 13:
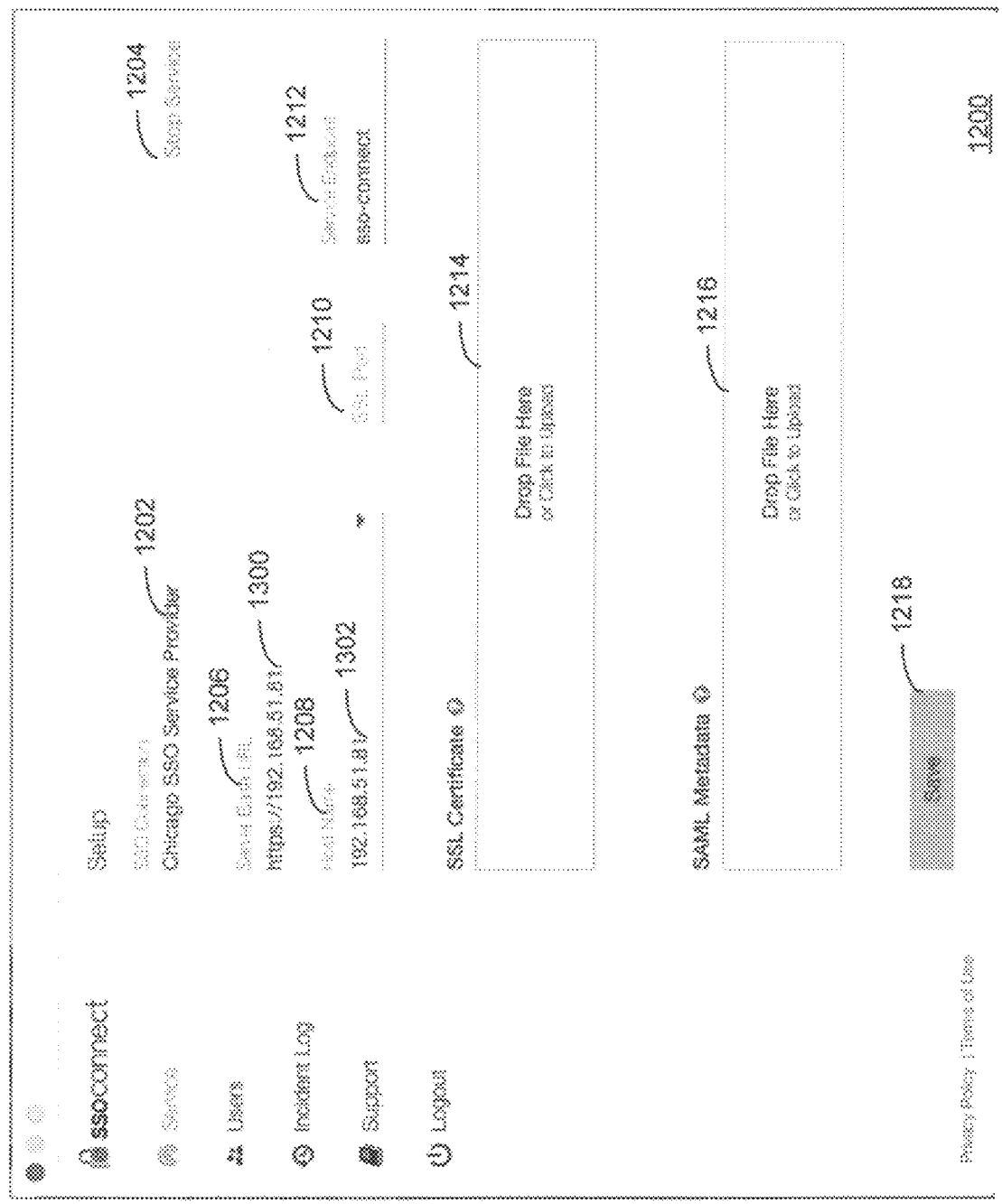
Figure 14:
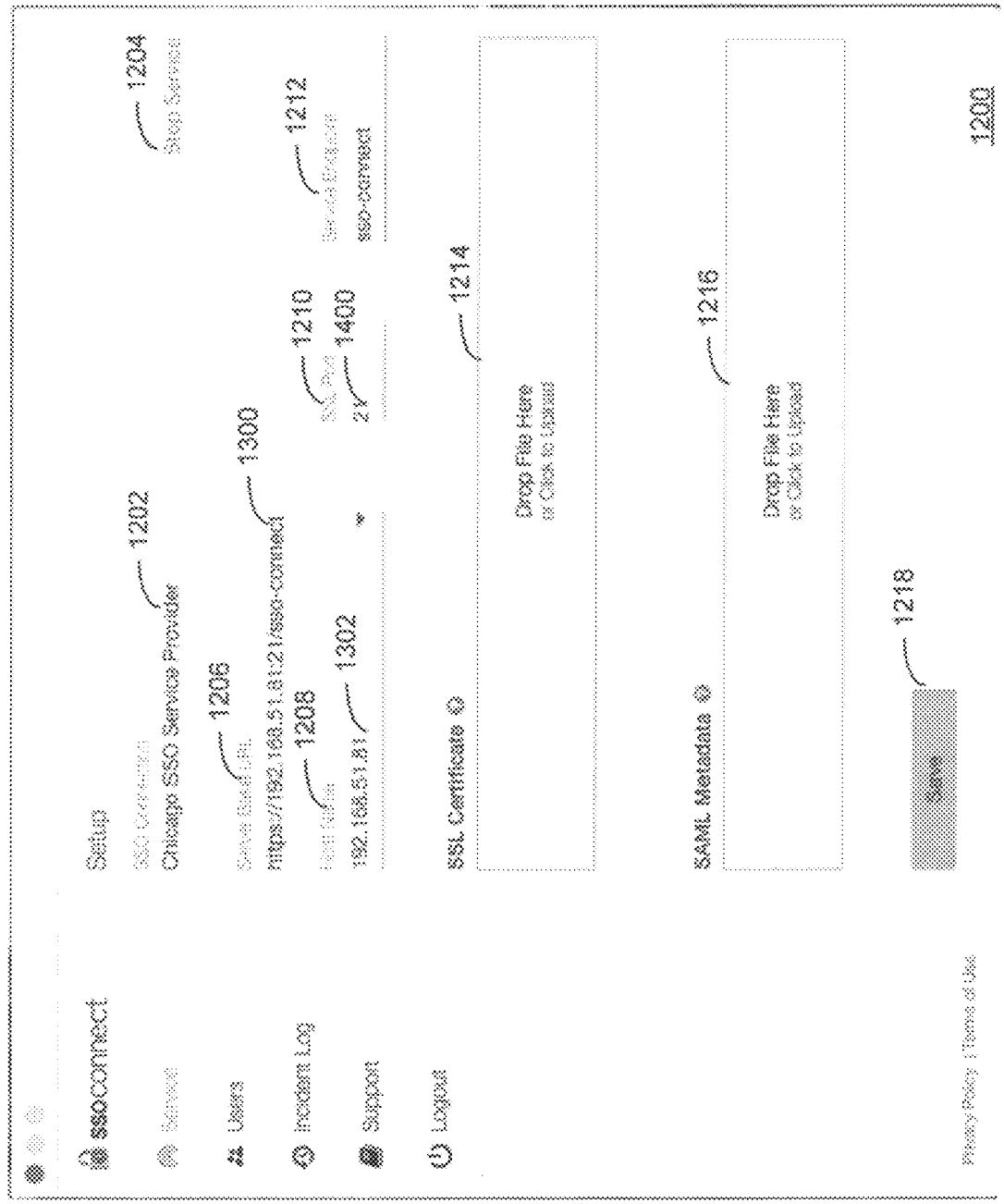
Figure 15:
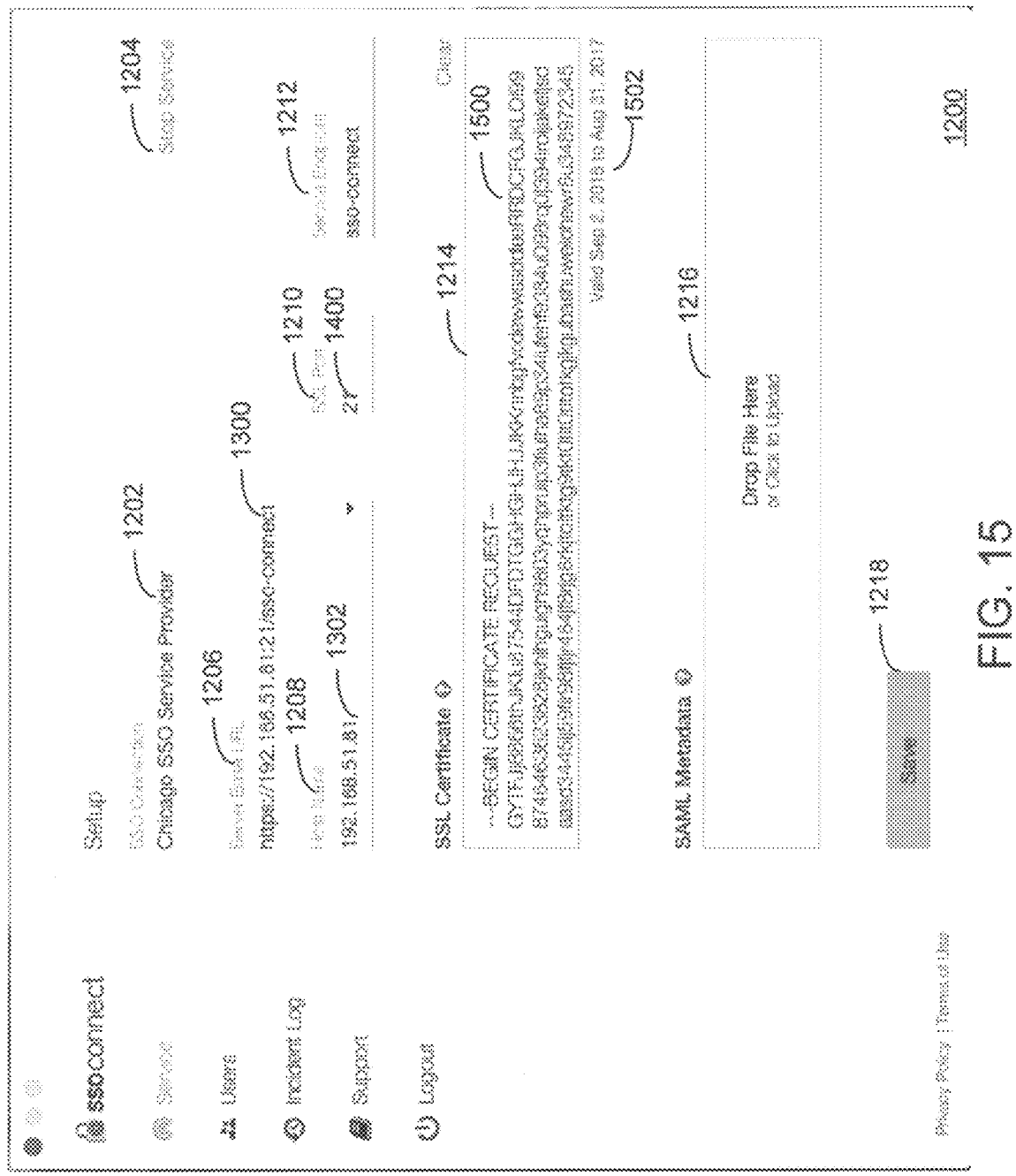
Figure 16:
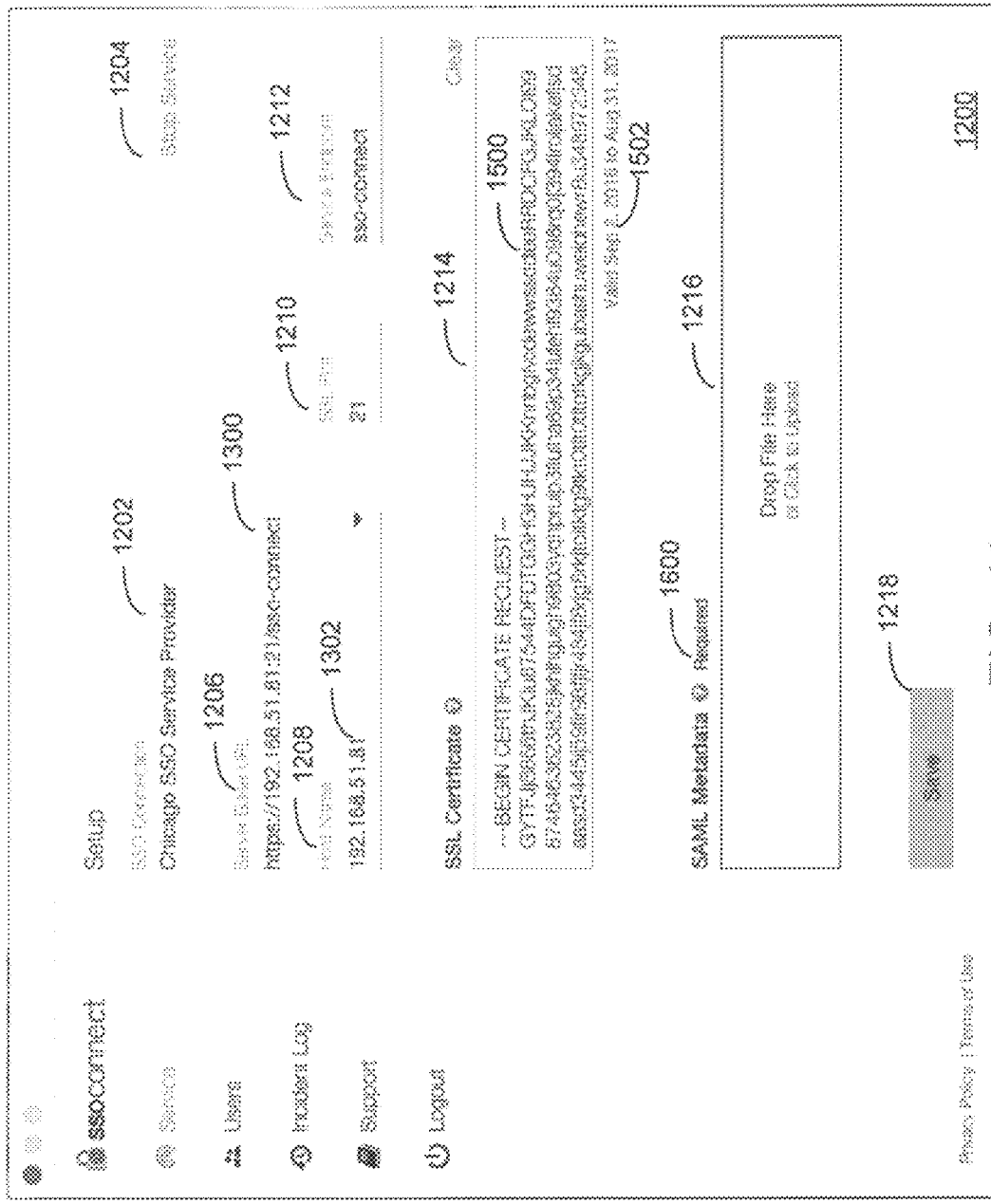
Figure 17:
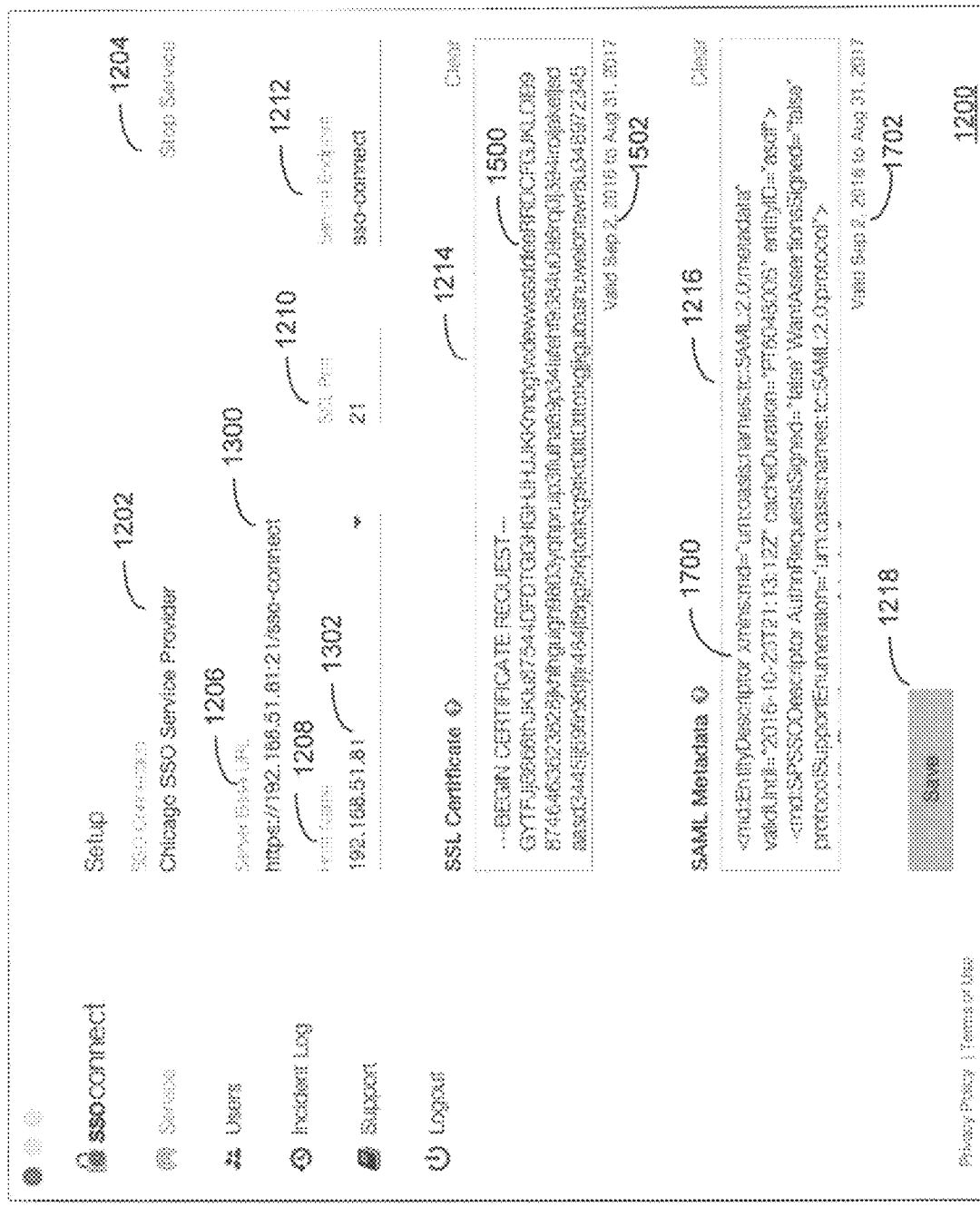

FIGS. 12-17 are screenshots of example setup screen 1200 of the client application 114 provided by the service provider for the client device 106. In FIG. 12, a connection filed 1202 displays the selected service provider and a stop service button 1204 can be engaged to end the connection. The setup screen 1200 can also display a base URL field 1206, a host name field 1208, a secure sockets layer (SSL) port field 1210, a service endpoint field 1212, an SSL certificate field 1214, a SAML metadata field 1216, and a save button 1218. In FIG. 13, the client device 106 can select the base URL 1300 and the host name 1302, e.g., from a drop down menu. In FIG. 14, the SSL port 1400 is entered. In FIG. 15, an SSL certificate file 1500 representing the SSL certificate is dropped in the SSL certificate field 1214 and/or the SSL certificate field 1214 is clicked to upload the SSL certificate file 1500. The client application 114 can display valid through dates 1502. In FIG. 16, the client application 114 can display a message 1600 that the SAML metadata is required. In FIG. 17, a SAML metadata file 1700 representing the SAML metadata is dropped in the SAML metadata field 1216 and/or the SAML metadata field 1216 is clicked to upload the SAML metadata file 1700. The client application 114 can display valid through dates 1702. The save button 1218 can be engaged to save the setup information for the client device 106.

Figure 18:
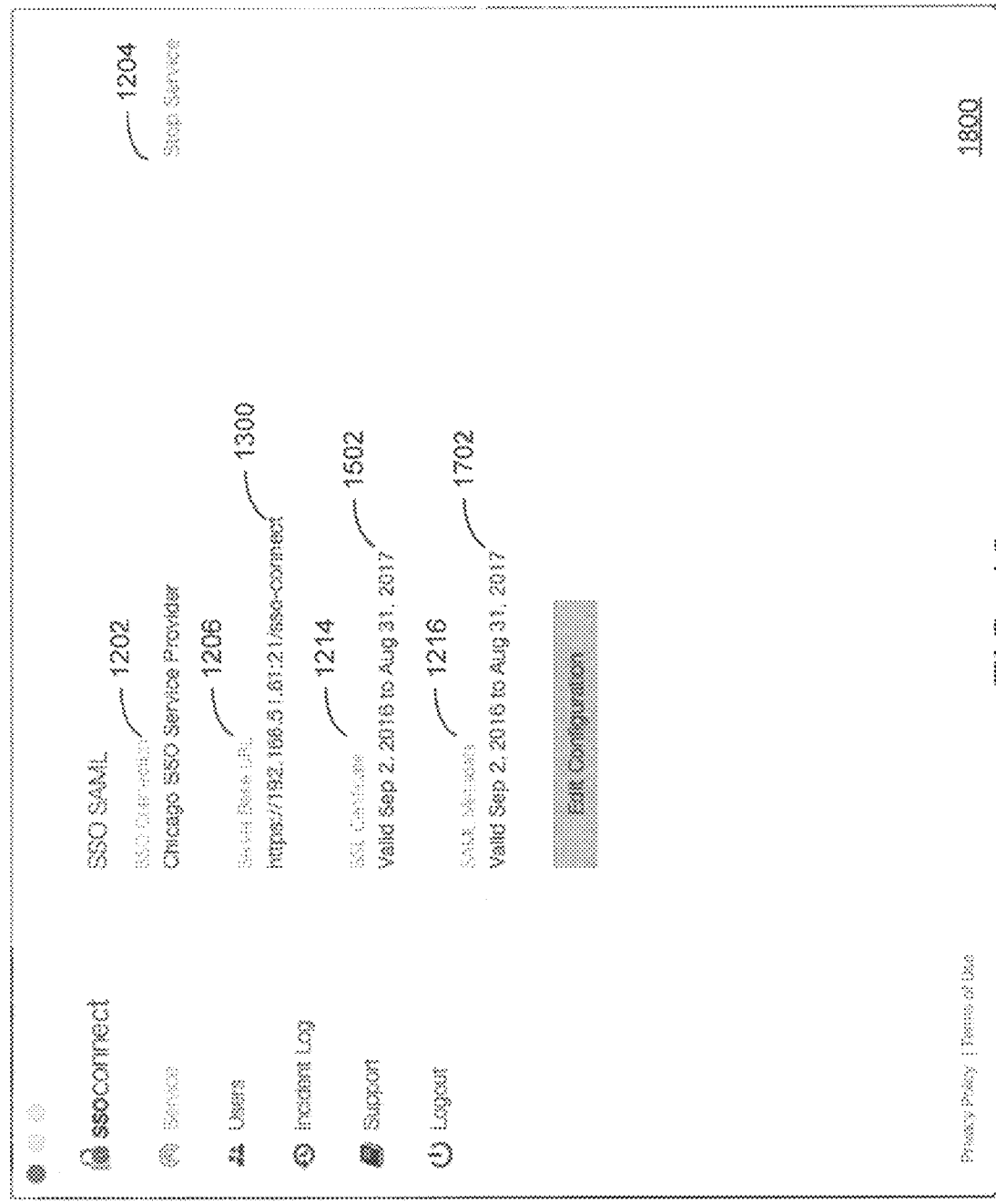
FIG. 18 is a screenshot of an example SAML connection summary screen.
Figure 19:
FIG. 19 is a screenshot of an example incident log screen.
Figure 20:
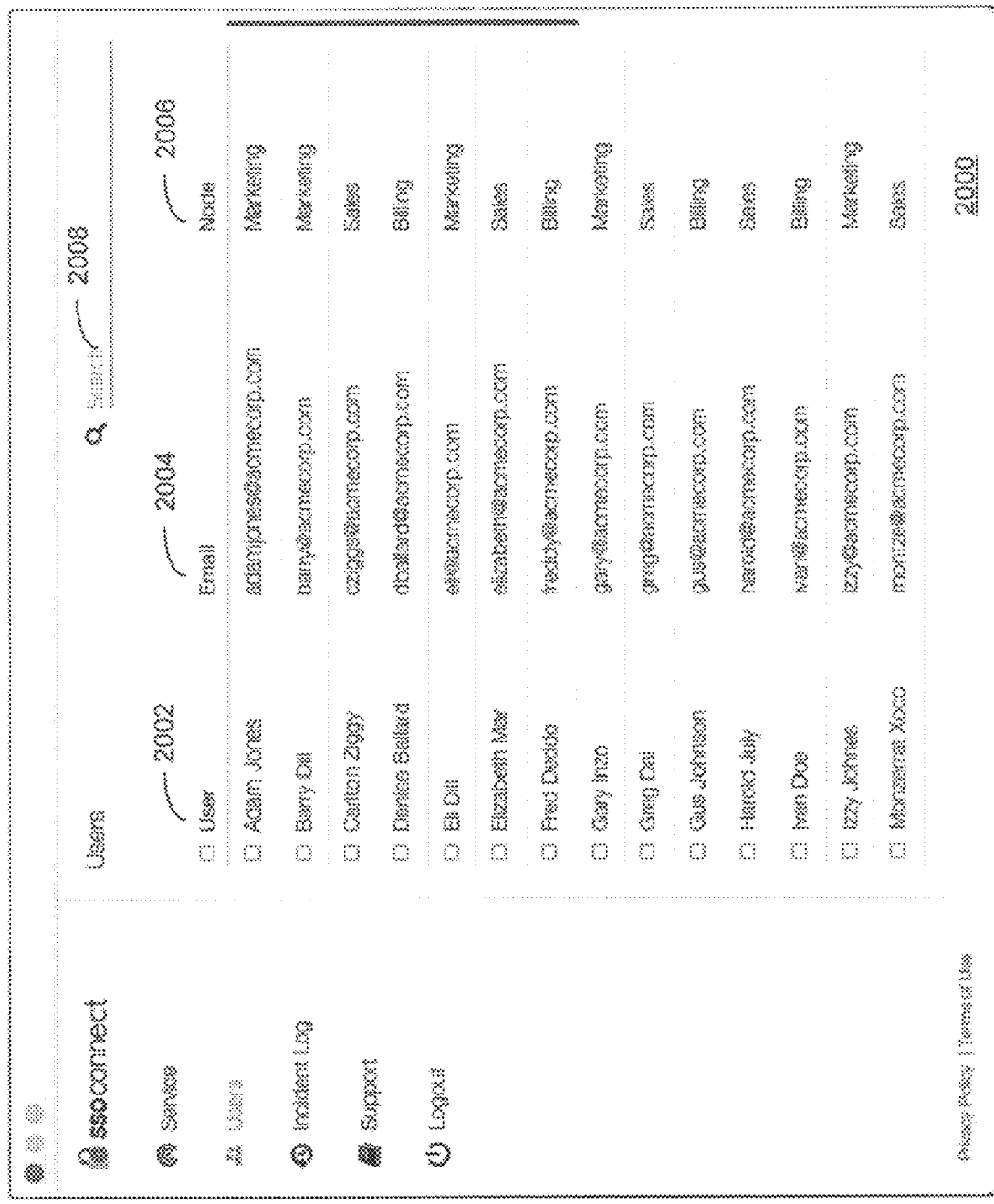
FIGS. 20-21 are screenshots of an example user account screen.
Figure 21:
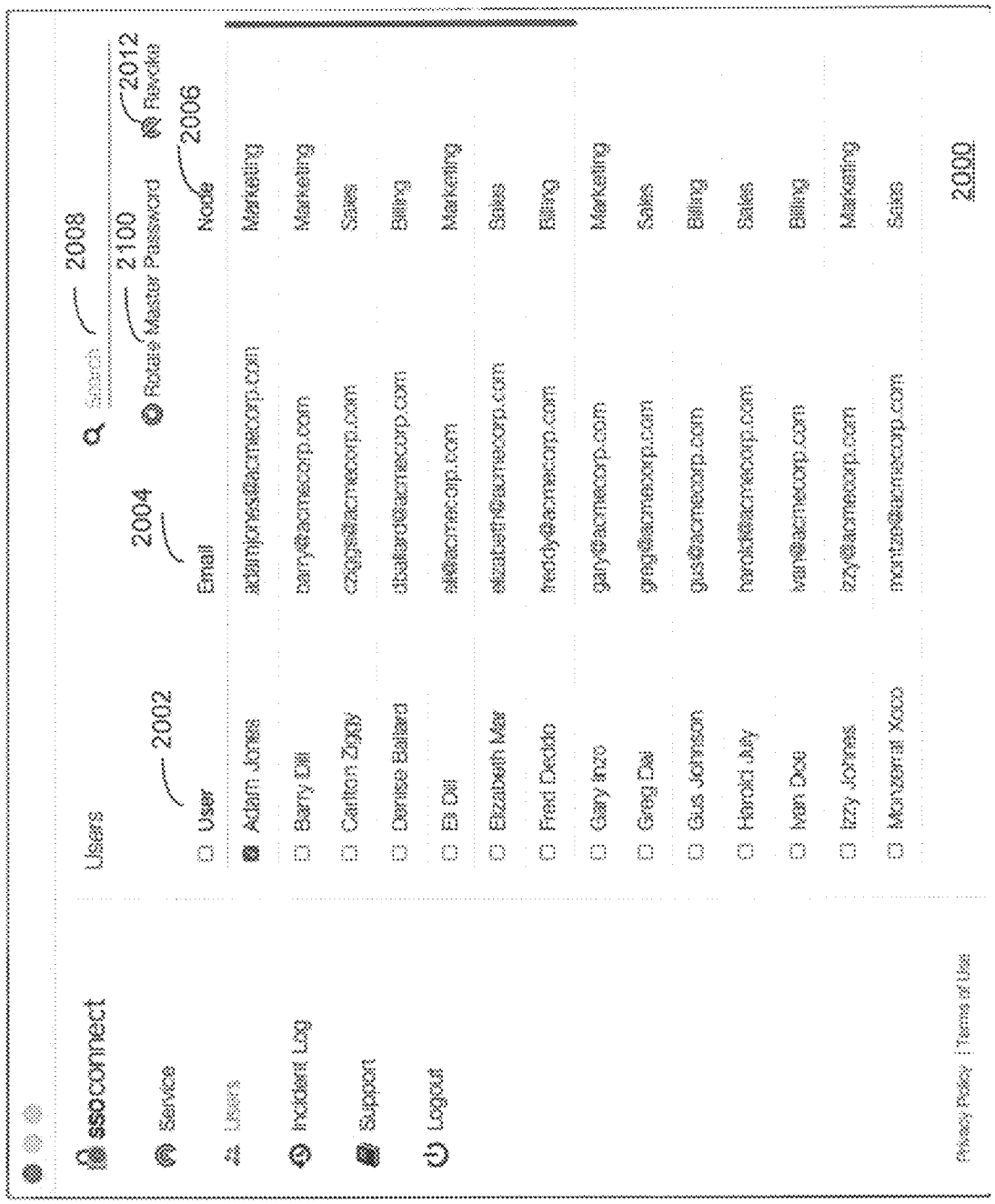
Figure 22:
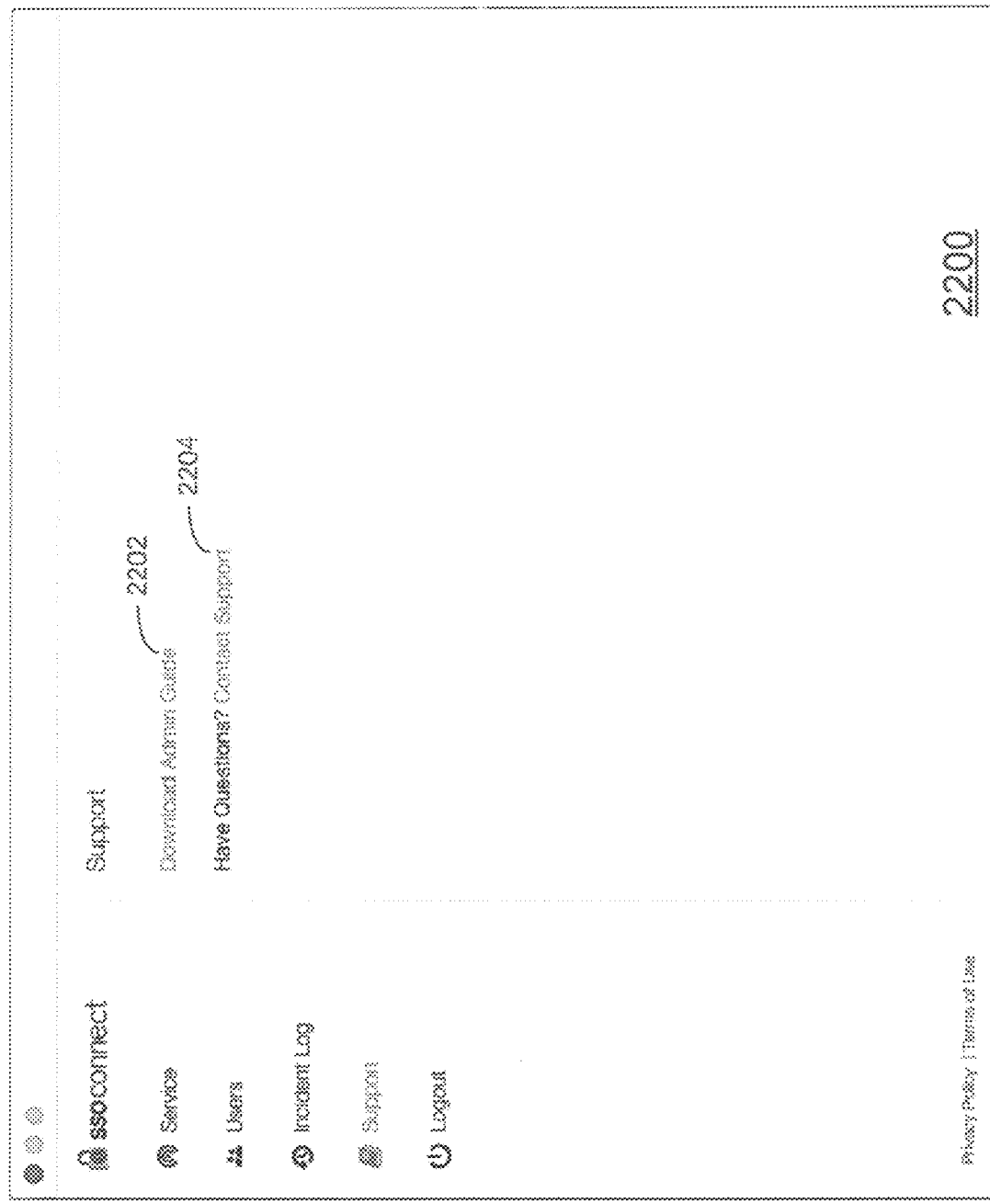
FIG. 22 is a screenshot of an example support screen.

FIG. 18 is a screenshot of an example SAML connection summary screen 1800. FIG. 19 is a screenshot of an example incident log screen 1900. The incident log screen 1900 can display connection related incidents 1902, e.g., sorted by date and time 1904. FIGS. 20-21 are screenshots of an example user account screen 2000. In FIG. 21, when the administrator is logged in, the client application 114 can be used to manage user accounts. The account screen 2000 can display a list of users 2002, their email addresses 2004 and other information including the users' node 2006, e.g., marketing, sales, billing, etc. The user account screen can include a search field 2008 to allow the client device 106 to search for different users. In FIG. 21, the user account screen 2000 can include a password button 2100 and revoke button 2102, e.g., for revoking a selected user's rights to the connection. FIG. 22 is a screenshot of an example support screen 2200 for providing support to the administrator of the connection, e.g., a downloadable support guide 2202 and a 'customer support' link 2204 for connecting with customer support via a network.

Figure 23:
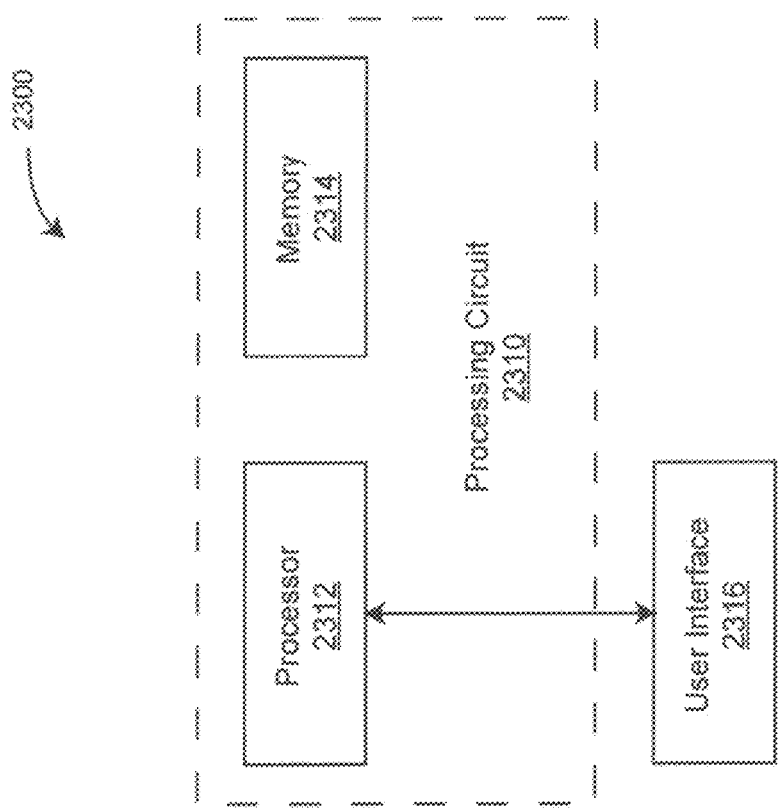
FIG. 23 is a block diagram of an example computing device of the connect module.

FIG. 23 is a block diagram of an example computing device 2300 of the connect module 108. The systems and methods described above may be implemented in many different ways in many different combinations of hardware, software firmware, or any combination thereof. In one example, the computing device 2300 may enable functions of the connect module 108. It can be appreciated that the components, devices or elements illustrated in and described with respect to FIG. 23 below may not be mandatory and thus some may be omitted in certain embodiments. Additionally, some embodiments may include further or different components, devices or elements beyond those illustrated in and described with respect to FIG. 23.

In some example embodiments, the computing device 2300 may include processing circuitry 2310 that is configurable to perform actions in accordance with one or more example embodiments disclosed herein. In some examples the processing circuitry 2310 includes the microcontroller 140 or other processor. The processing circuitry 2310 may be configured to perform and/or control performance of one or more functionalities of the connect module 108. The processing circuitry 2310 may be configured to perform data processing, application execution and/or other processing and management services according to one or more example embodiments. In some embodiments, the computing device 2300 or a portion(s) or component(s) thereof, such as the processing circuitry 2310, may include one or more chipsets and/or other components that may be provided by integrated circuits.

In some example embodiments, the processing circuitry 2310 may include a processor 2312 and, in some embodiments, such as that illustrated in FIG. 23, may further include memory 2314. The processor 2312 may be embodied in a variety of forms. For example, the processor 2312 may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it can be appreciated that the processor 2312 may include a plurality of processors. The plurality of processors may be in operative communication with each other and may be collectively configured to perform one or more functionalities of the computing device 2300 as described herein. In some example embodiments, the processor 2312 may be configured to execute instructions that may be stored in the memory 2314 or that may be otherwise accessible to the processor 2312. As such, whether configured by hardware or by a combination of hardware and software, the processor 2312 is capable of performing operations according to various embodiments while configured accordingly.

In some example embodiments, the memory 2314 may include one or more memory devices. Memory 2314 may include fixed and/or removable memory devices. In some embodiments, the memory 2314 may provide a non-transitory computer-readable storage medium that may store computer program instructions that may be executed by the processor 2312. In this regard, the memory 2314 may be configured to store information, data, applications, instructions and/or the like for enabling the computing device 2300 to carry out various functions in accordance with one or more example embodiments. In some embodiments, the memory 2314 may be in communication with one or more of the processor 2312, the user interface 2316 for passing information among components of the computing device 2300. The user interface 2316 can include one or more of a keyboard, a keypad, a mouse, a trackball, a touchscreen, a stylus, etc.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A computer-implemented method for facilitating a single sign-on to a digital vault provided by a service provider, comprising:

detecting by a connect module a login attempt, where the login attempt is from an application provided by the service provider and stored local to a client device;

performing by the connect module a redirect and sending the client device to authenticate on an identity provider with one or more login credentials;

receiving by the connect module via a security protocol an authentication of the client device from the identity provider, without receiving an encryption key; and providing by the connect module a master password to the application local to the client device in response to the authentication, where the master password decrypts the digital vault without the service provider knowing the master password encoding the master password in the redirect within a fragment identifier of a universal resource locator, or embedding the master password within the HTML body of the response to the authentication, or embedding the master password inside a Javascript code section within the response to the authentication;

reading, by the client application, the master password from the response to the authentication, and deriving an encryption key using a password derivation function; and wherein the client application uses the encryption key to log the client device into the digital vault and decrypt the digital vault.

2. The computer-implemented method of claim 1, wherein the identity provider is configured within the connect module.

3. The computer-implemented method of claim 1, wherein the connect module is hosted by at least one of an enterprise network, client-side on-premise server, or a cloud hosting provider not operated by the service provider.

4. The computer-implemented method of claim 3, wherein the master password is stored in an encrypted format on the enterprise network, the client-side on-premise server, or the cloud hosting provider.

5. The computer-implemented method of claim 1, wherein the identity provider is configured within the connect module.

6. The computer-implemented method of claim 1, wherein the connect module is opened with a determined Internet protocol address or hostname.

7. The computer-implemented method of claim 1, wherein the redirect comprises an Hypertext Transfer Protocol Secure redirect.

8. The computer-implemented method of claim 1, wherein information stored in the digital vault is instantly encrypted and decrypted on-the-fly on the client device even when using the client application provided by the service provider.

9. The computer-implemented method of claim 1, wherein the digital vault is able to authenticate the client device and decrypt data for the client device without the identity provider or service provider having access to the encryption key.

10. The computer-implemented method of claim 1, further including administering users of the connect module.

11. The computer-implemented method of claim 1, wherein the digital vault at least one of securely stores, protects, manages and shares passwords, documents, digital assets and photos.

12. A computer-implemented method for facilitating a single sign-on to a digital vault provided by a service provider, comprising:

detecting by a connect module a login attempt, where the login attempt is from an application provided by the service provider and stored local to a client device;

performing by the connect module a redirect and sending the client device to authenticate on an identity provider with one or more login credentials;

receiving by the connect module via a security protocol an authentication of the client device from the identity provider, without receiving an encryption key;

providing by the connect module a master password to the application local to the client device in response to the authentication, where the master password decrypts the digital vault without the service provider knowing the master password, wherein the master password is sent via the redirect directly to the client application;

encoding the master password in the redirect within a fragment identifier of a universal resource locator, or embedding the master password within the HTML body of the response to the authentication, or embedding the master password inside a Javascript code section within the response to the authentication; and reading, by the client application, the master password from the response to the authentication, and deriving an encryption key using a password derivation function, the client application using the encryption key to log the client device into the digital vault and decrypt the digital vault.

13. The computer-implemented method of claim 12, wherein the redirect comprises at least one of a Hypertext Transfer Protocol Secure protocol and a push notification.

14. The computer-implemented method of claim 12, wherein the fragment identifier is not transmitted beyond a scope of the redirect, and remains stored within a memory of the client device so as not to be accessible by the service provider.

15. The computer-implemented method of claim 12, wherein the encryption key is not stored or transmitted to the digital vault.

16. The computer-implemented method of claim 12, wherein the connect module is further configured to receive an authentication of the client device via a security protocol from the identity provider, without receiving an encryption key.

17. The computer-implemented method of claim 12, wherein the connect module is hosted by at least one of an enterprise network, client-side on-premise server, or a cloud hosting provider not operated by the service provider.

18. The computer-implemented method of claim 12, wherein the master password is not transmitted beyond a scope of the redirect, and remains stored within a memory of the client device so as not to be accessible by the service provider.

19. The computer-implemented method of claim 12, further comprising the client application reading the master password from a response of the connect module, and deriving an encryption key using a password derivation function.

* * * * *